3,154,554
TERTIARY AMINES
Ernst Seeger, Biberach an der Riss, Germany, assignor, by mesne assignments, to Boehringer Ingelheim G.m.b.H., Ingelheim am Rhine, Germany, a corporation of Germany
No Drawing. Filed July 5, 1960, Ser. No. 40,556
Claims priority, application Germany July 9, 1959
4 Claims. (Cl. 260—293)

The present invention relates to novel tertiary amines, and more particularly to tertiary amines having the general structural formula

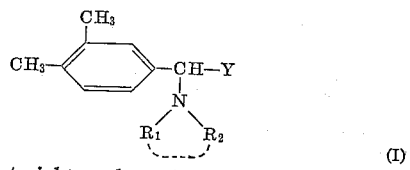
(I)

wherein Y is a straight or branched-chain alkyl radical, a cycloalkyl radical, an aryl radical which may be substituted with lower alkyl or lower alkoxy groups, or an aralykl radical; and $R_1$ and $R_2$ are alkyl groups or, together with the nitrogen atom, may form a heterocylclic ring which may contain another hetero atom, such as a piperidyl, pyrollidyl or morpholyl ring, as well as to their nontoxic, pharmacologically acceptable quaternary ammonium compounds and acid addition salts.

The new compounds according to the present invention exhibit an unexpected distinct oxytocic activtiy.

The oxytocic effect was determined on a guinea pig uterus in situ according to the method of Rothlin (Schweiz, Med. Wochenschrift, 69, 971–975 (1938)), the compounds being administered intravenously. The comparative substance was methylergobasin-maleinate. The toxicity of 1-(3,4-dimethyl-phenyl)-1-piperidyl-propane hydrochloride is less than that of the equally effective methylergobasin-maleinate. Thus, the $LD_{50}$ determined in mice after intraperitoneal administration of 1-(3,4-dimethyl-phenyl)-1-piperidyl-propane hydrochloride is 98 mg./kg. and that of methylergobasin-maleinate is 65 mg./kg.

The compounds of the present invention may be prepared by reacting nitriles of the general formula

(II)

with organomagnesium halides of the formula

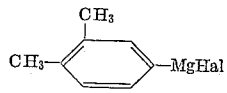
(III)

or by reacting nitriles of the general formula

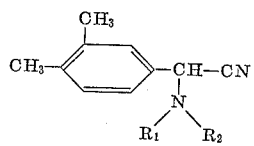
(IV)

with organomagnesium halides of the formula

Y—Mg—Hal (V)

In Formulas II to V, substituents Y, $R_1$ and $R_2$ have the same meanings as defined in connection with Formula I above.

Both of these reactions are advantageously carried out in suitable solvents, such as ether, tetrahydrofuran, benzene, dioxane, dibutylether, etc. or in mixtures of these solvents, preferably at moderately elevated temperatures.

The new compounds may also be produced by other known methods. Thus, they may be prepared by reductive amination of ketones having the general formula

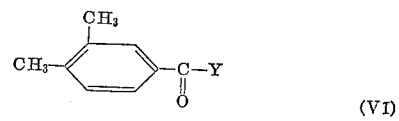
(VI)

with amines of the formula

(VII)

for example, by means of hydrogen in the presence of a noble metal catalyst or in the presence of Raney nickel or by means of formic acid or formates according to Leuckart-Wallach, possibly under pressure and/or at elevated temperatures.

The new compounds may also be produced by alkylation of primary amines of the general formula

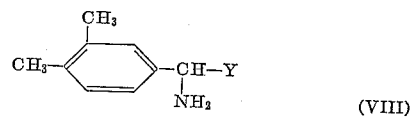
(VIII)

The alkylation agent may be an alkyl halide, a dialkyl sulfate, an aromatic sulfonic acid ester and other customary alkylation agents. In those cases where methyl groups are to be introduced, the methylation may also be carried out by known methods with the aid of formic acid and formaldehyde. By reaction with a 1,4-dihalobutane or a 1,5-dihalopentane, the corresponding pyrrolidyl and piperidyl compounds may be obtained in very simple fashion. In the above Formulas VI to VIII, substituents Y, $R_1$ and $R_2$ also have the previously indicated meanings.

If desired, the compounds obtained by the above methods may be transformed into quaternary ammonium compounds by known methods, i.e. with customary quaternizing agents. Furthermore, compounds according to the invention may also be transformed by known methods into their simple acid addition salts. Particularly suitable for this purpose are those acids the anions of which are pharmacologically acceptable. Examples of such acids are hydrochloric acid, hydrobromic acid, sulfuric acid, phosphoric acid, acetic acid, tartaric acid and ascorbic acid.

In those cases where the nitriles used as starting materials for the preparation of the present tertiary amines were not already known, they were produced by known methods (see Houben-Weyl, Methoden der Organischen Chemie, 4th edition, vol. 8, pages 279 and following).

The following examples will further illustrate the present invention and enable others skilled in the art to understand it more completely. It is understood, however, that the invention is not limited to these particular illustrative examples.

EXAMPLE I

1-(3,4-Dimethylphenyl)-1-Piperidyl-Ethane 13.8 gm. α-piperidyl-propionitrile, dissolved in 30 cc. ether, were added dropwise, accompanied by stirring, to a Grignard reagent prepared in customary fashion from 4.8 gm. magnesium powder and 37 gm. 1-bromo-3,4-dimethylbenzene in anhydrous ether. After all of the solution had been added the reaction mixture was refluxed for one hour, cooled and decomposed into a two-phase system by addition of ice and dilute hydrochloric acid. The ethereal phase was separated and discarded. Ammonium chloride and then ammonia were added to the acid aqueous phase until it was alkaline. The oil which separated thereby was taken up in ether, the ether solution was dried over sodium sulfate and the ether was evaporated. After distillation of the residue in vacuo, 11 gm. of the reaction product were obtained in the form of a colorless liquid having a boiling point of 112° C. at 0.3 mm. Hg. The product had the structural formula

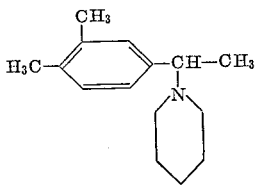

By dissolving the free base in ether and adding an ethereal solution of hydrochloric acid to the ether solution, the hydrochloric acid addition salt of the free base was obtained which, recrystallized from acetone, yielded colorless crystals having a melting point of 191–193° C.

EXAMPLE II

1-(3,4-Dimethylphenyl)-1-Dimethylamino-2-Phenyl-Ethane 17.4 gm. 2-phenyl-1-dimethylamino-propionitrile, dissolved in benzene, were added dropwise, accompanied by stirring, to a Grignard reagent prepared from 4.8 gm. magnesium powder and 37 gm. 1-bromo-3,4-dimethylbenzene in dry benzene. After all of the nitrile solution had been added, the resulting reaction mixture was heated for about one hour at 50–60° C. The reaction mixture obtained thereby was then worked up as described in Example I. 14 gm. of the tertiary amine having the structural formula

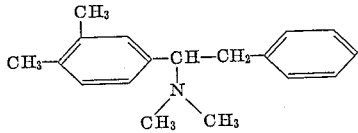

and a boiling point of 129–130° C. at 0.35 mm. Hg were obtained. Its hydrochloride, after boiling with acetone, had a melting point of 206–208° C.

EXAMPLE III

1-(3,4-Dimethylphenyl)-1-Morpholyl-Butane 16.8 gm. α-morpholyl-valeronitrile, dissolved in a mixture of benzene and tetrahydrofuran (1:1) were added dropwise at 50–60° C., accompanied by stirring, to a Grignard reagent prepared from 4.8 gm. magnesium powder and 37 gm. 1-bromo-3,4-dimethyl-benzene in a mixture of benzene and tetrahydrofuran (1:1). The reaction mixture thus obtained was then refluxed for thirty minutes, allowed to cool, decomposed into a two-phase system by adding ice and dilute hydrochloric acid, and the benzene phase was separated and discarded. Ammonium chloride and then ammonia were added to the aqueous acid phase until it was alkaline. The oil which separated out was taken up in ether, the ether solution was dried, the ether was evaporated and the residue was distilled. 11 gm. of the tertiary amine having the structural formula

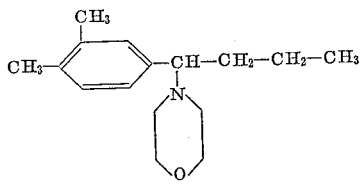

and a boiling point of 105° C. at 0.05 mm. Hg were obtained. Its hydrochloride, after recrystallization from acetone, had a melting point of 220–221° C.

EXAMPLE IV

3,4-Dimethylphenyl-Cyclohexyl-Piperidyl-Methane

A Grignard reagent prepared from 4.8 gm. magnesium and 37 gm. 1-bromo-3,4-dimethylbenzene in anhydrous tetrahydrofuran was added dropwise at a temperature of 50° C., accompanied by stirring, to 21 gm. of cyclohexyl-piperidylacetonitrile, and after all the Grignard reagent had been added the resulting reaction mixture was refluxed for half an hour. The reaction mixture was allowed to cool, ice and dilute hydrochloric acid were added until the mixture was acid and then ammonium chloride was added thereto. By addition of ammonia until alkaline reaction, the amine reaction product was liberated, taken up in ether, the ether was evaporated and the residue was distilled in vacuo. 17 gm. of the tertiary amine having the structural formula

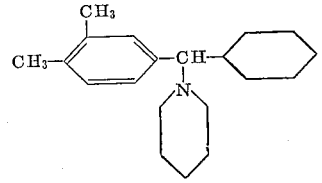

were obtained in the form of a colorless, viscous oil having a boiling point of 134–135° C. at 0.02 mm. Hg. The hydrochloride of the free amine had a melting point of 244° C. after recrystallization from acetone.

EXAMPLE V

1-(3,4-Dimethylphenyl)-1-Diethylamino-Butane 6.5 gm. of (3,4-dimethylphenyl)-diethylaminoacetonitrile (boiling point 103–105° C. at 0.1 mm. Hg), dissolved in ether, were added dropwise, accompanied by stirring, to a Grignard reagent prepared from 1.45 gm. magnesium and 7.4 gm. propyliodide in ether. The resulting reaction mixture was refluxed for one hour and was then worked up in the manner described in Example I. 5 gm. of the tertiary amine having the structural formula

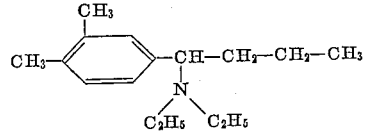

were obtained in the form of a colorless liquid having a boiling point of 93–95° C. at 0.09 mm. Hg.

EXAMPLE VI

(3,4-Dimethylphenyl)-Dimethylamino-Phenyl-Methane-Bromobenzylate 4 gm. of benzyl bromide were added to 4.7 gm. of (3,4-dimethylphenyl) - dimethylamino - phenyl - methane dissolved in 30 cc. toluene, and the resulting reaction mixture was refluxed for two hours. The mixture was allowed to cool, the solvent was poured off, the residue was triturated with ether and then with a mixture of acetone and toluene (1:1). The solid residue was separated and recrystallized from acetone. The quaternary ammonium compound having the structural formula

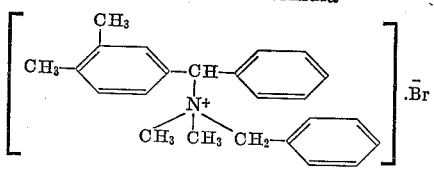

was obtained in the form of colorless crystals having a melting point of 174–175° C.

EXAMPLE VII

*1-(3,4-Dimethylphenyl)-1-Piperidyl-Ethane*

17 gm. of piperidine were placed into a round-bottom flask provided with a descending condenser and 9.2 gm. of anhydrous formic acid were added. The resulting reaction mixture was heated slowly on an oil bath until the temperature was about 170° C. and until no more distillate passed over. The substance remaining in the flask was allowed to cool, 7.4 gm. 3,4-dimethyl-acetophenone were added, then 2.3 gm. anhydrous formic acid were added and finally 1 gm. magnesium chloride hexahydrate was added. The mixture was then heated for five hours at 240–250° C. At the end of this period the reaction mixture was allowed to cool, admixed with 10 cc. concentrated hydrochloric acid and the resulting mixture was refluxed for twenty minutes. Thereafter, water was added to the reaction mixture and it was extracted by shaking with ether. The ether solution was separated and discarded. Dilute sodium hydroxide was added to the acid aqueous phase, whereby the reaction product separated out. The reaction product was taken up with ether and the ether solution was separated and evaporated. 4 gm. of the tertiary amine having the structural formula

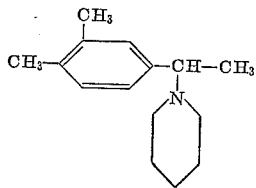

were obtained. Its hydrochloride had a melting point of 193° C. after recrystallization from acetone.

EXAMPLE VIII

*1-(3,4-Dimethylphenyl)-1-Piperidyl-Ethane*

6.0 gm. of 1-(3,4-dimethylphenyl) - 1 - amino - ethane were dissolved in 50 cc. isopropanol, 11.5 gm. of 1,5-dibromopentane and 5 gm. sodium acetate were added to the resulting solution and the mixture was heated for three hours on a boiling water bath. The reaction mixture was then filtered, the filtrate was evaporated to dryness and the residue was taken up in dilute hydrochloric acid. The acid solution was then extracted by shaking with ether. The ether phase was separated and discarded. By addition of dilute sodium hydroxide to the aqueous acid phase until it was alkaline, the reaction product was precipitated out. The product was taken up in ether, the ether was evaporated from the solution and 4 gm. of the teritary amine having the structural formula

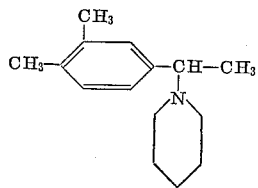

were obtained in the form of a colorless liquid having a boiling point of 156° C. at 12 mm. Hg. The hydrochloride of the tertiary amine had a melting point of 193° C. after recrystallization from acetone.

EXAMPLE IX

*1-(3,4-Dimethylphenyl)-1-Piperidyl-Ethane*

7.4 gm. of 3,4-dimethyl-acetophenone and 5 gm. of piperidine were dissolved in 50 cc. ethanol in a shaker autoclave. 0.15 gm. of platinum oxide catalyst was added to the solution and then hydrogen was introduced into the autoclave under a pressure of 50 atmospheres for eight hours at a temperature of about 50° C. The contents of the autoclave were filtered to separate the catalyst, the filtrate was distilled to drive off the solvent and the residue was taken up in dilute hydrochloric acid. After shaking the solution with ether and discarding the ether phase, the aqueous acid solution was made alkaline by addition of sodium hydroxide, whereby the reaction product separated out. The reaction product was taken up in ether and the ether was evaporated from the solution. 1 gm. of the tertiary amine having the structural formula

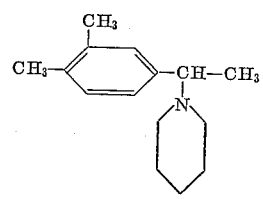

was obtained. Its hydrochloride had a melting point of 193° C. after recrystallization from acetone.

EXAMPLE X

*1-(3,4-Dimethylphenyl)-1-Dimethylamino-Ethane*

2 gm. of 1-(3(4-dimethylphenyl)-1-amino-ethane were admixed with 5 cc. anhydrous formic acid, 5 cc. of a 40% aqueous formaldehyde solution and 0.5 gm. of p-formaldehyde, and the resulting mixture was heated for two hours on a boiling water bath. Thereafter, the reaction mixture was poured into water, the aqueous solution was acidified by addition of dilute hydrochloric acid and the acid solution was extracted by shaking with ether. The ether phase was separated and discarded. The aqueous acid solution was made alkaline with dilute sodium hydroxide, whereby the reaction product separated out, which was taken up in ether. The ether was evaporated, yielding 1.5 gm. of the teritary amine having the structural formula

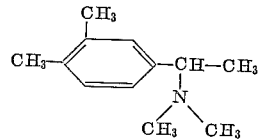

in the form of a colorless liquid. Its hydrochloride had a melting point of 229° C. after recrystallization from acetone.

EXAMPLE XI

*1-(3,4-Dimethylphenyl)1-Dimethylamino-Ethane*

7.4 gm. of 3,4-dimethyl-acetophenone and 5 gm. of anhydrous dimethylamine were dissolved in 50 cc. ethanol in a hydrogenation autoclave, 2 gm. Raney nickel catalyst were added thereto and then hydrogen was introduced at a temperature of 80° C. under a pressure of four atmospheres until no more hydrogen absorption could be detected. Thereafter, the contents of the hydrogenation autoclave were filtered to separate the catalysts, the filtrate was distilled in vacuo to drive off the solvent and the residue was taken up in dilute hydrochloric acid. The acid solution was extracted by shaking with ether and the ether phase was discarded. The reaction product was separated out of the aqueous acid solution by addition of dilute sodium hydroxide and the product was separated and taken up in ether. After evaporation of the ether, 1 gm. of the weakly colored tertiary amine having the structural formula

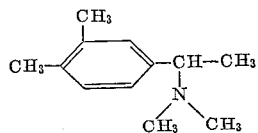

was obtained. Its hydrochloride had a melting point of 229° C. after recrystallizing it twice from acetone.

EXAMPLE XII

1-(3,4-Dimethylphenyl)-1-Pyrrolidyl-Ethane 7.4 gm. of 3,4-dimethyl-acetophenone and 5 gm. of pyrrolidine were dissolved in 50 cc. methanol in a shaker autoclave, 0.15 gm. platinum oxide catalyst was added to the solution and then hydrogen was introduced at room temperature under a pressure of three atmospheres until no more absorption of hydrogen could be detected. The contents of the autoclave were then filtered to separate the catalysts and the filtrate was worked up as described in the preceding example. 4 gm. of the slightly colored tertiary amine having the structural formula

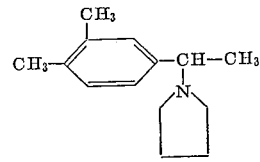

were obtained. Its hydrochloride had a melting point of 145° C. after recrystallization from ethyl acetate.

The following table lists additional tertiary amines of the Formula I which were prepared. The table indicates, for each compound, the starting materials used, the identity of substituents $R_1$, $R_2$ and Y in Formula I, the boiling point of the free tertiary amine, the melting point of the corresponding hydrochloric acid addition salt and the yield obtained.

| Example No. | Starting Materials | $R_1$ | $R_2$ | Y | Free Base B.P., °C. | At mm. Hg | Hydrochloride, M.P., °C. | Yield Percent of Theory |
|---|---|---|---|---|---|---|---|---|
| XIII | α-Piperidyl-butyronitrile and 3,4-dimethyl-phenyl-1-magnesium bromide. | -CH₂-CH₂-CH₂-CH₂-CH₂- | | —CH₂—CH₃ | 122 | 0.4 | 215–216 (recrystallized from acetone). | 62 |
| XIV | α-Piperidyl-valeronitrile and 3,4-dimethyl-phenyl-1-magnesium bromide. | -CH₂-CH₂-CH₂-CH₂-CH₂- | | —CH₂—CH₂—CH₃ | 117 | 0.3 | 182–183 (recrystallized from acetone). | 53 |
| XV | α-Piperidyl-isovaleronitrile and 3,4-dimethyl-phenyl-1-magnesium bromide. | -CH₂-CH₂-CH₂-CH₂-CH₂- | | —CH—CH₃<br>\|<br>CH₃ | 101 | 0.05 | 214 (recrystallized from acetone). | 64 |
| XVI | p-Methoxyphenylpiperidyl-acetonitrile and 3,4-dimethyl-phenyl-1-magnesium bromide. | -CH₂-CH₂-CH₂-CH₂-CH₂- | | —C₆H₄—OCH₃ | 164–166 | 0.03 | 194 (recrystallized from ethyl acetate/ether). | 73 |
| XVII | 2-phenyl-2-methyl-1-piperidyl-propionitrile and 3,4-dimethyl-phenyl-1-magnesium bromide. | -CH₂-CH₂-CH₂-CH₂-CH₂- | | —CH(CH₃)—C₆H₅ | 151 | 0.05 | 222 (recrystallized from methyl ethyl ketone). | 64 |
| XVIII | 3-phenyl-1-piperidylbutyronitrile and 3,4-dimethyl-phenyl-1-magnesium bromide. | -CH₂-CH₂-CH₂-CH₂-CH₂- | | —CH₂—CH₂—C₆H₅ | 157 | 0.02 | 184 (recrystallized from acetone). | 70 |
| XIX | p-Ethoxyphenyl-piperidyl-acetonitrile and 3,4-dimethyl-phenyl-1-magnesium bromide. | -CH₂-CH₂-CH₂-CH₂-CH₂- | | —C₆H₄—OC₂H₅ | 178–179 | 0.08 | 202 (recrystallized from methyl ethyl ketone). | 71 |
| XX | p-Methylphenyl-piperidyl-acetonitrile and 3,4-dimethyl-phenyl-1-magnesium bromide. | -CH₂-CH₂-CH₂-CH₂-CH₂- | | —C₆H₄—CH₃ | 169 | 0.15 | 235 (recrystallized from acetone). | 68 |
| XXI | α-Pyrrolidyl-valeronitrile and 3,4-dimethyl-phenyl-1-magnesium bromide. | —CH₂—CH₂—CH₂—CH₂— | | —CH₂—CH₂—CH₃ | 100–102 | 0.03 | 183–184 (recrystallized from methyl ethyl ketone). | 77 |
| XXII | α-Pyrrolidyl-isocapronitrile and 3,4-dimethyl-phenyl-1-magnesium bromide. | —CH₂—CH₂—CH₂—CH₂— | | —CH₂—CH—CH₃<br>\|<br>CH₃ | 101–103 | 0.07 | 174–176 (recrystallized from ethyl acetate). | 74 |
| XXIII | α-Pyrrolidyl-propionitrile and 3,4-dimethyl-phenyl-1-magnesium bromide. | —CH₂—CH₂—CH₂—CH₂— | | —CH₃ | 90 | 0.03 | 144–145 (recrystallized from ethyl acetate). | 59 |
| XXIV | α-Pyrrolidyl-octanitrile and 3,4-dimethyl-phenyl-1-magnesium bromide. | —CH₂—CH₂—CH₂—CH₂— | | —(CH₂)₅—CH₃ | 135 | 0.08 | 167–168 (recrystallized from acetone). | 73 |
| XXV | 2-phenyl-1-pyrrolidyl-propionitrile and 3,4-dimethyl-phenyl-1-magnesium bromide. | —CH₂—CH₂—CH₂—CH₂— | | —CH₂—C₆H₅ | 141 | 0.07 | 202–203 (recrystallized from acetone). | 60 |

| Example No. | Starting Materials | $R_1$ | $R_2$ | Y | Free Base b.p., °C. | At mm. Hg | Hydrochloride, m.p., °C. | Yield Percent of Theory |
|---|---|---|---|---|---|---|---|---|
| XXVI | α-Dimethylamino-isocapronitrile and 3,4-dimethyl-phenyl-1-magnesium bromide. | —CH₃ | —CH₃ | —CH₂—CH—CH₃<br>          \|<br>          CH₃ | 76 | 0.02 | 211 (recrystallized from acetone). | 82 |
| XXVII | Phenyl-dimethylamino-acetonitrile and 3,4-dimethyl-phenyl-1-magnesium bromide. | —CH₃ | —CH₃ | —C₆H₅ | 109 | 0.03 | 227–228 (recrystallized from acetone). | 78 |
| XXVIII | p-Methoxyphenyl-dimethylamino-acetonitrile and 3,4-dimethyl-phenyl-1-magnesium bromide. | —CH₃ | —CH₃ | —C₆H₄—OCH₃ | 144 | 0.05 | 147 (recrystallized from acetone). | 67 |
| XXIX | α-Diethylamino-isovaleronitrile and 3,4-dimethyl-phenyl-1-magnesium bromide. | —C₂H₅ | —C₂H₅ | —CH—CH₃<br>    \|<br>    CH₃ | 79 | 0.03 | 96 (recrystallized from acetone). | 73 |
| XXX | α-Dibutylamino-valeronitrile and 3,4-dimethyl-phenyl-1-magnesium bromide. | —C₄H₉ | —C₄H₉ | —CH₂—CH₂—CH₃ | 116 | 0.03 | | 76 |

While I have illustrated the present invention with the aid of certain specific embodiments thereof, it will be readily apparent to others skilled in the art that my invention is not limited to these embodiments and that various changes and modifications may be made without departing from the spirit of the invention or the scope of the appended claims.

What I claim is:

1. 1-(3,4-dimethylphenyl)-1-piperidino-ethane hydrochloride.
2. 1-(3,4-dimethylphenyl)-1-piperidino-propane hydrochloride.
3. 1-(3,4-dimethylphenyl)-1-piperidino-butane hydrochloride.
4. 1-(3,4-dimethylphenyl)-1-piperidino-2-methyl-propane hydrochloride.

References Cited in the file of this patent

UNITED STATES PATENTS

| | | |
|---|---|---|
| 2,982,783 | Schenck et al. | May 2, 1961 |
| 3,109,845 | Seeger et al. | Nov. 5, 1963 |

FOREIGN PATENTS

| | | |
|---|---|---|
| 203,495 | Austria | May 25, 1959 |
| 806,259 | Great Britain | Dec. 23, 1958 |
| 807,837 | Great Britain | Jan. 21, 1959 |
| 227,293 | Switzerland | Aug. 16, 1943 |

OTHER REFERENCES

Novelli: Journal of the American Chemical Society, vol. 61, page 521 (1939).

Protiva et al.: Chemicke Listy, vol. 47: pages 1621–1632 (1953), abstracted in Chemical Abstracts, vol. 49, page 248e, f (1955).

Kadatz et al.: Arzneimittel Forschung, vol. 6: page 345 (1957).

Terent' ev et al.: Zhurnal Obschei Khimii, vol. 27, pages 1092–1100 (1957); abstracted in Chemical Abstracts 52, page 3709g (1958).